(12) United States Patent
Bowman et al.

(10) Patent No.: US 11,049,143 B1
(45) Date of Patent: Jun. 29, 2021

(54) PROMOTION RECOMMENDATION SYSTEM BASED UPON BEVERAGE ASSOCIATED WITH SOCIAL MEDIA INFLUENCER AND RELATED METHODS

(71) Applicant: Inmar Clearing, Inc., Winston-Salem, NC (US)

(72) Inventors: Jacob Bowman, High Point, NC (US); Melissa Bube, High Point, NC (US); Joel Corra, Winston-Salem, NC (US); Jason Eudy, Pinnacle, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 16/667,259

(22) Filed: Oct. 29, 2019

(51) Int. Cl.
*G06Q 30/02* (2012.01)
*G06N 5/04* (2006.01)

(52) U.S. Cl.
CPC .......... *G06Q 30/0261* (2013.01); *G06N 5/04* (2013.01); *G06Q 30/0267* (2013.01); *G06Q 30/0269* (2013.01)

(58) Field of Classification Search
CPC .......... G06Q 30/0261; G06Q 30/0269; G06Q 30/0267; G06N 5/04
See application file for complete search history.

(56) References Cited

U.S. PATENT DOCUMENTS

| | | | |
|---|---|---|---|
| 9,390,145 B2 | 7/2016 | Weiss et al. | |
| 10,380,644 B1 | 8/2019 | Walker et al. | |
| 2007/0121843 A1 | 5/2007 | Atazky et al. | |
| 2010/0125490 A1 | 5/2010 | Kiciman et al. | |
| 2012/0150631 A1 | 6/2012 | Root et al. | |
| 2013/0268359 A1* | 10/2013 | Young | G06Q 50/01 705/14.53 |
| 2014/0019225 A1 | 1/2014 | Guminy et al. | |
| 2014/0188742 A1* | 7/2014 | Deselaers | G06Q 30/0282 705/319 |
| 2015/0278225 A1* | 10/2015 | Weiss | H04W 4/021 705/14.58 |
| 2016/0165002 A1* | 6/2016 | LeBeau | H04W 4/21 709/204 |
| 2018/0336592 A1* | 11/2018 | Kurra | G06F 16/9535 |

OTHER PUBLICATIONS

"Twitter is giving brands a new way to promote their chatbots" (Perez, Sareh; Published on TechCrunch.com May 23, 2017) (Year: 2017).*
Bowman et al., U.S. Appl. No. 16/155,123, filed Oct. 9, 2018.

* cited by examiner

*Primary Examiner* — James M Detweiler
(74) *Attorney, Agent, or Firm* — Allen, Dyer, Doppelt + Gilchrist, P.A. Attorneys at Law

(57) ABSTRACT

A promotion recommendation system may include a user device associated with a given user, and a promotion recommendation server. The promotion recommendation server may be configured to identify a social media influencer followed by the given user and determine a beverage associated with the social media influencer. The beverage may have ingredients. The promotion recommendation server may also be configured to cooperate with the user device to determine a current geographic location of the given user, generate a recommended beverage having one of the ingredients, and generate a digital promotion for the recommended beverage for redemption at a redemption location based upon the current geographic location of the given user. The promotion recommendation server may also be configured to communicate the digital promotion to the user device.

22 Claims, 3 Drawing Sheets

PROMOTION RECOMMENDATION SYSTEM BASED UPON BEVERAGE ASSOCIATED WITH SOCIAL MEDIA INFLUENCER AND RELATED METHODS

TECHNICAL FIELD

The present invention relates to the field of electronics, and more particularly, to the location-based processing of promotional offers and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A promotion recommendation system may include a user device associated with a given user and a promotion recommendation server. The promotion recommendation server may be configured to identify a social media influencer followed by the given user and determine a beverage associated with the social media influencer. The beverage may have a plurality of ingredients. The promotion recommendation server may also be configured to cooperate with the user device to determine a current geographic location of the given user, generate at least one recommended beverage having at least one of the plurality of ingredients, and generate at least one digital promotion for the at least one recommended beverage for redemption at a redemption location based upon the current geographic location of the given user. The promotion recommendation server may also be configured to communicate the at least one digital promotion to the user device.

The at least one ingredient may include a brand of alcohol. The at least one ingredient may include a type of alcohol, for example.

The redemption location may be within a threshold proximity of the current geographic location of the user. The at least one recommended beverage may include a plurality of recommended beverages each having at least one of the plurality of ingredients. The plurality of recommended beverages each may have a same at least one of the plurality of ingredients, for example.

The at least one digital promotion may include a plurality of digital promotions. The plurality of digital promotions may each correspond to one of the plurality of recommended beverages, for example.

The promotion recommendation system may further include a point-of-sale terminal at a redemption location. The promotion recommendation server may be configured to cooperate with the POS terminal to redeem the at least one digital promotion.

The promotion recommendation server may be configured to determine the beverage associated with the social media influencer based upon the social media influencer liking the beverage, for example. The user device may include a mobile wireless communications device, for example.

A method aspect is directed to a method of processing a promotion recommendation. The method may include using a promotion recommendation server to identify a social media influencer followed by a given user having a user device associated therewith, and determine a beverage associated with the social media influencer. The beverage may have a plurality of ingredients. The method may also include using the promotion recommendation server to cooperate with a user device to determine a current geographic location of the given user, generate at least one recommended beverage having at least one of the plurality of ingredients, and generate at least one digital promotion for the at least one recommended beverage for redemption at a redemption location based upon the current geographic location of the given user. The method may further include using the promotion recommendation server to communicate the digital promotion to the user device.

A computer readable medium aspect is directed to a non-transitory computer readable medium for processing a promotion recommendation. The non-transitory computer readable medium may include computer executable instructions that when executed by a processor cause the processor to perform operations. The operations may include identifying a social media influencer followed by a given user having a user device associated therewith, and determining a beverage associated with the social media influencer. The beverage may have a plurality of ingredients. The operations may also include cooperating with a user device to determine a current geographic location of the given user, generating at least one recommended beverage having at least one of the plurality of ingredients, and generating at least one digital promotion for the at least one recommended beverage for redemption at a redemption location based upon the current geographic location of the given user. The operations may also include communicating the digital promotion to the user device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
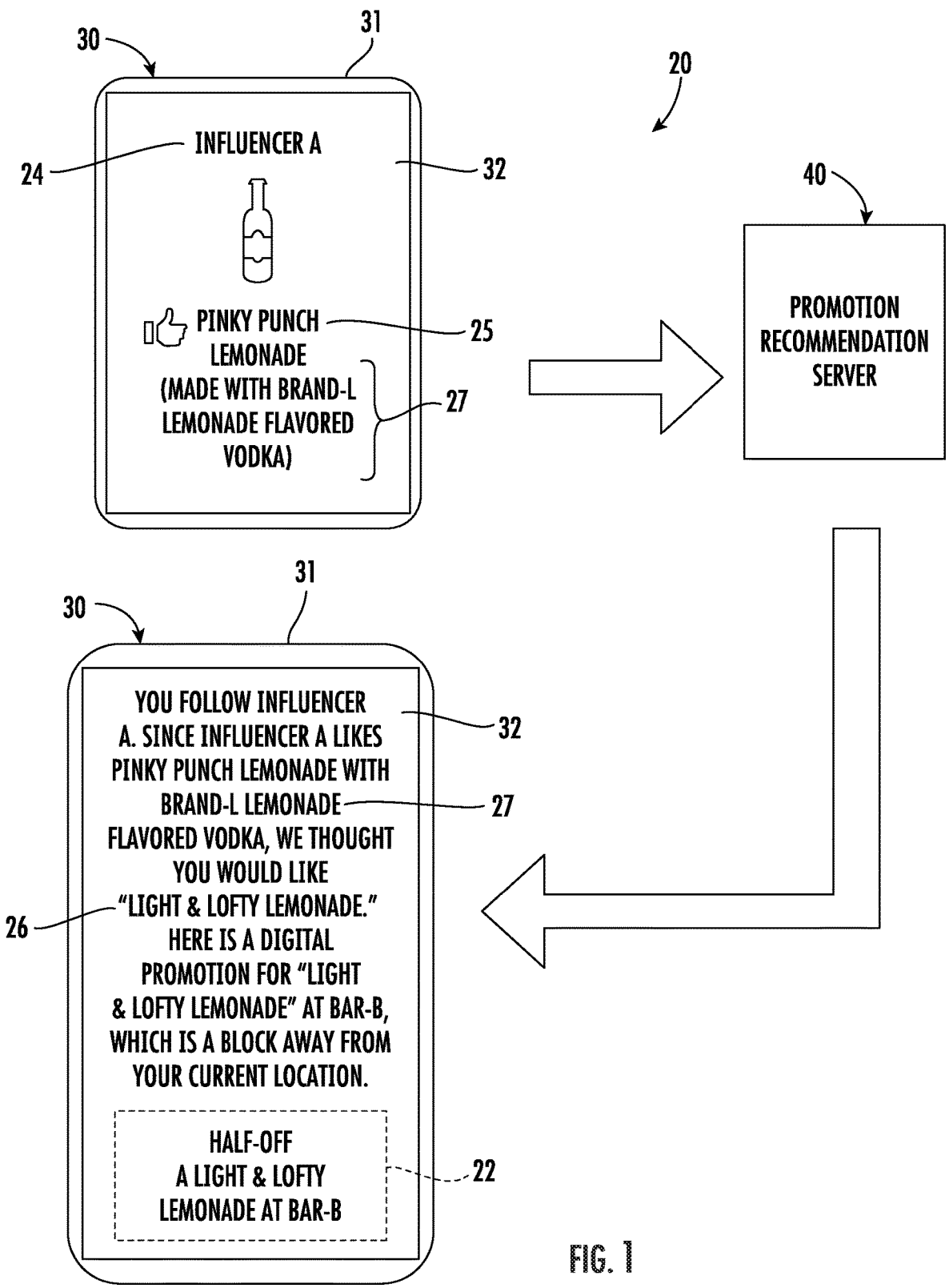
FIG. 1 is a schematic diagram of a portion of a promotion processing system according to an embodiment.
Figure 2:
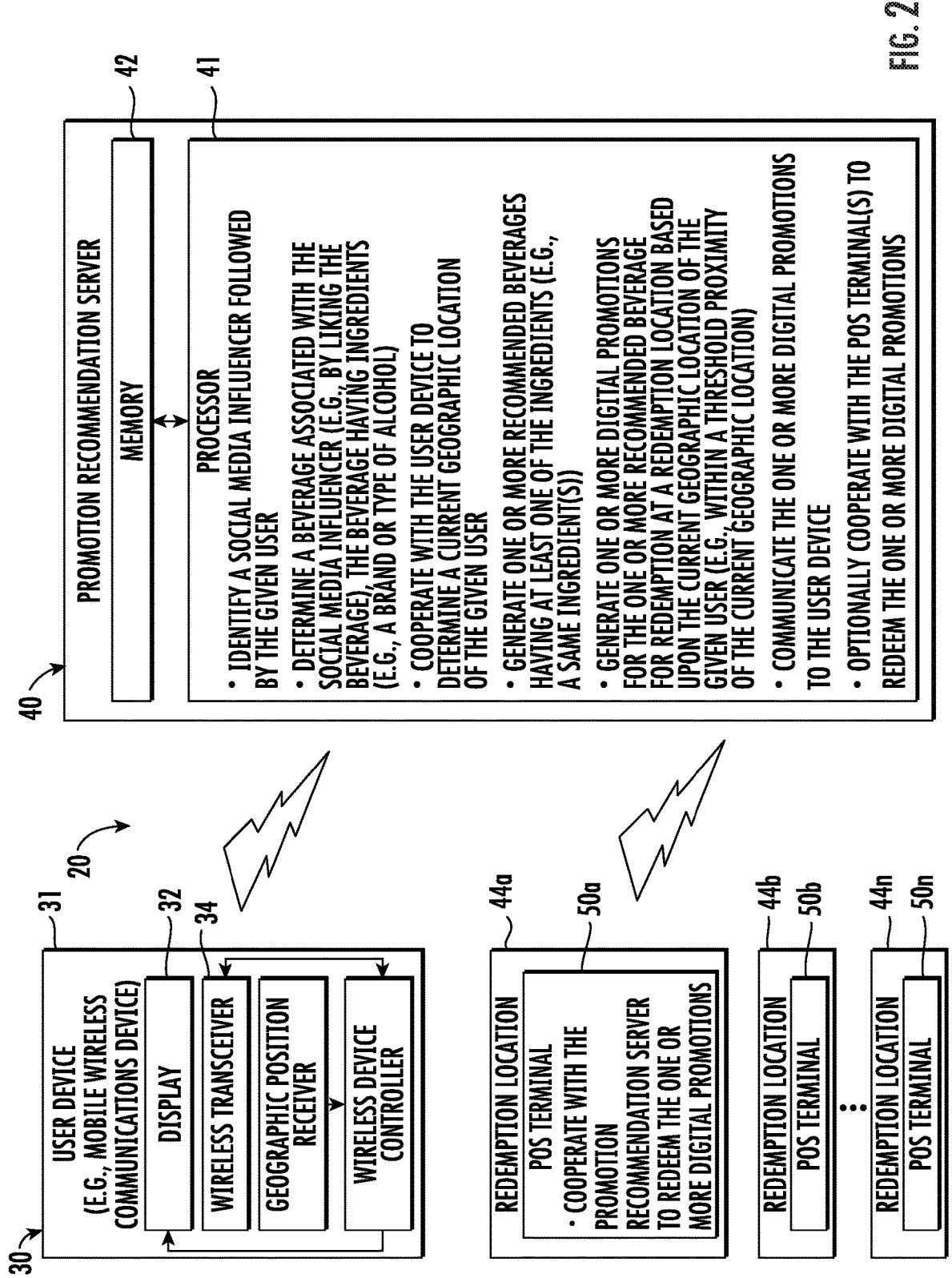
FIG. 2 is a more-detailed schematic block diagram of the promotion processing system as shown in FIG. 1.

Referring initially to FIG. 1 a promotion recommendation system 20 includes user device 30 that is illustratively in the form of a mobile wireless communications device and is associated with a given user. The mobile wireless communications device 30 includes a housing 31 and a display 32 carried by the housing. The display 32 may be in the form of a touch display, thus also defining an input device, as will be appreciated by those skilled in the art. The mobile wireless communications device 30 also includes a wireless transceiver 34 and a wireless device controller 35 coupled to the wireless transceiver. The mobile wireless communications device 30 may also include a geographic position receiver 33 (e.g., a GPS receiver) coupled to the wireless device controller 35. The display 32 is also coupled to the wireless device controller 35. While a mobile wireless communications device 30 is illustrated and described, the mobile wireless communications device may be in the form of a personal computer, laptop computer, tablet computer, or wearable device.

The promotion recommendation system 20 also includes a promotion recommendation server 40. The promotion recommendation server 40 includes a processor 41 and an associated memory 42. While operations of the promotion recommendation server 40 are described herein, it will be appreciated that the processor 41 and memory 42 cooperate to perform the operations.

Figure 3:
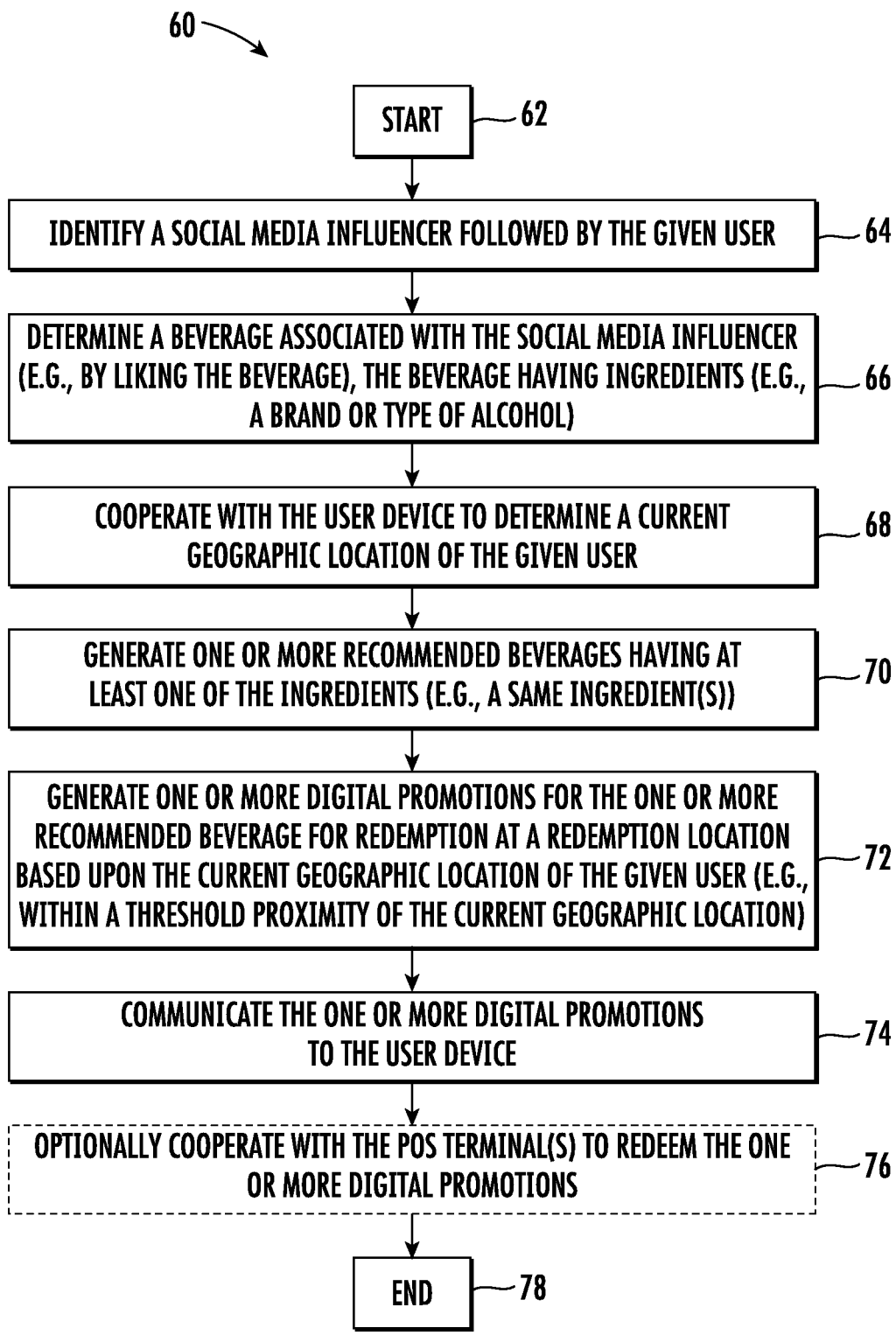
FIG. 3 is a flow diagram illustrating operation of the promotion recommendation server of FIG. 2.

Referring now to the flowchart 60 in FIG. 3, beginning at Block 62, operations of the promotion recommendation server 40 will now be described. The promotion recommendation server 40, at Block 64, identifies a social media influencer 24 followed by the given user. The promotion recommendation server 40 may identify the social media influencer 24 based upon social media account credentials associated with the given user to access the social media account. In some embodiments, the promotion recommendation server 40 may obtain, e.g., by scraping data, the social medial influencer 24 from a public facing portion of a social media account, social media posting, or social media wall associated with the given user. While an exemplary display 32 of the mobile wireless communications device 30 associated with the given user is illustrated (FIG. 1), it should be understood the above-described functions of the promotion recommendation server 40 may be performed without interaction from the given user and/or without being displayed.

At Block 66, the promotion recommendation server 40 determines a beverage 25 that includes ingredients 27, for example an alcoholic beverage, associated with the social media influencer 24. For example, the determined beverage 25 may be a mixed drink that includes a mixer and an alcohol type (e.g., vodka, gin, etc.) or particular brand of alcohol. In an exemplary embodiment, the social media influencer 24 may like, tag, post, or link to a particular alcoholic beverage, for example, "Pinky Punch Lemonade" that includes cranberry juice and Brand-L lemonade flavored vodka.

The promotion recommendation server 40 cooperates with the user device or mobile wireless communications device 30 to determine a current geographic location of the given user (Block 68). For example, the promotion recommendation server 40 may obtain the geographic location from the mobile wireless communications device 30 based upon the geographic position receiver 33. The mobile wireless communications device 30 may also communicate the geographic location to the promotion recommendation server 40.

Other and/or additional techniques for cooperating with the mobile wireless communications device 30 to determine the geographic location of the given user may be used. For example, triangulation among service towers or antennas, internet protocol (IP) addresses, and/or network identifiers may be used to determine the geographic location of the given user.

The promotion recommendation sever 40, at Block 70, generates a recommended beverage 26 that has one or more of the ingredients 27 of the beverage associated with the social media influencer 24. In some embodiments, the promotion recommendation server 40 may generate more than one recommended beverage 26 each of which having one or more ingredients 27 of the beverage associated with the social media influencer 24. The one or more ingredients 27 of the recommended beverages 26 may be the same as any one or more of the ingredients of the beverage associated with the social media influencer 24. With respect to the exemplary implementation above, the recommended beverage 26 may be "Light & Lofty Lemonade" that includes lemonade with a splash of Brand-L lemonade flavored vodka.

The promotion recommendation server 40 generates a digital promotion 22 for the recommend beverage 26 (Block 72). The digital promotion 22 is redeemable at a redemption location 44a-44n based upon the current geographic location of the given user. The promotion recommendation server 40 may generate more than one digital promotion that may be redeemable at a given location (e.g., the same location for different recommended beverages) or different locations 44a-44n (e.g., different recommended beverages or the same recommended beverage at different redemption locations). In an embodiment, the promotion recommendation server 40 may determine one or more redemption locations 44a-44n within a threshold proximity or distance of the current geographic location of the user. For example, the promotion recommendation server 40 may determine the redemption location to be within a 1-mile radius, a 5-mile radius, or other defined threshold proximity of the current geographic location. In some embodiments, the promotion recommendation server 40 may determine based upon changes, or more particularly, rates of changes, in geographic locations of the given user and may determine the redemption location threshold proximity based upon the rate (e.g. if the rate corresponds to driving, the threshold proximity may be larger, while if the rate corresponds to walking, the threshold proximity may be smaller). With respect to the exemplary implementation, the digital promotion 22 may be for "Half-OFF 'Light & Lofty Lemonade' at Bar-B."

The promotion recommendation server 40 communicates, for example, wirelessly, the digital promotion 22 or promotions to the user device or mobile wireless communications device 30 (Block 74). The digital promotion 22 is illustratively displayed on the display 32 of the mobile wireless communications device 30. The digital promotion 22 may be displayed along with comments as to how or why the given user is receiving the digital promotion. The digital promotion 22 may be displayed within a social media feed associated with the given user, a chatbot conversation, and/or via an application running on the mobile wireless communications device 30.

The redemption locations 44a-44n each has a point-of-sale (POS) terminal 50a-50n thereat. The promotion recommendation server 40 may cooperate with each of the POS terminals 50*a*-50*n* to redeem any digital promotions 22 (Block 76). Further details of processing promotions with respect to beverages and via POS terminals are described in U.S. Pat. No. 10,380,644, the entire contents of which is hereby incorporated by reference. Operations end at Block 78.

A method aspect is directed to a method of processing a promotion recommendation. The method includes using a promotion recommendation server 40 to identify a social media influencer 24 followed by a given user having a user device 30 associated therewith, and determine a beverage 25 associated with the social media influencer. The beverage 25 has a plurality of ingredients 27. The method also includes using the promotion recommendation server 40 to cooperate with the user device 30 to determine a current geographic location of the given user, generate at least one recommended beverage 26 having at least one of the plurality of ingredients 27, and generate at least one digital promotion 22 for the at least one recommended beverage for redemption at a redemption location 44*a*-44*n* based upon the current geographic location of the given user. The method further includes using the promotion recommendation server 40 to communicate the digital promotion to the user device 30.

A computer readable medium aspect is directed to a non-transitory computer readable medium for processing a promotion recommendation. The non-transitory computer readable medium includes computer executable instructions that when executed by a processor 41 cause the processor to perform operations. The operations include identifying a social media influencer 24 followed by a given user having a user device 30 associated therewith, and determining a beverage 25 associated with the social media influencer. The beverage 25 has a plurality of ingredients 27. The operations also include cooperating with the user device 30 to determine a current geographic location of the given user, generating at least one recommended beverage 26 having at least one of the plurality of ingredients 27, and generating at least one digital promotion 22 for the at least one recommended beverage for redemption at a redemption location 44*a*-44*n* based upon the current geographic location of the given user. The operations also include communicating the digital promotion 22 to the user device 30.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion recommendation system comprising:
a user device associated with a given user, the given user having a social media account associated therewith; and
a promotion recommendation server configured to:
identify a social media influencer followed by the given user by scraping data from a public facing portion of the social media account,
determine a beverage associated with the social media influencer,
identify a plurality of ingredients of the beverage based upon the determined beverage,
cooperate with the user device to determine a current geographic location of the given user,
generate at least one recommended beverage having at least one of the plurality of ingredients, at least one generated recommended beverage being a beverage that is different than the beverage associated with the social media influencer and having at least one of the plurality of ingredients,
cooperate with the user device to determine a rate of change of geographic position of the given user,
determine a threshold distance from the current geographic location based upon the rate of change of geographic position,
determine at least one redemption location within the threshold distance from the current geographic location,
generate at least one digital promotion for the at least one recommended beverage for redemption at the at least one redemption location, at least one generated digital promotion being for the at least one generated recommended beverage that is different from the beverage associated with the social media influencer and having at least one of the plurality of ingredients, and
communicate the at least one digital promotion to the user device.

2. The promotion recommendation system of claim 1 wherein the at least one ingredient comprises a brand of alcohol.

3. The promotion recommendation system of claim 1 wherein the at least one ingredient comprises a type of alcohol.

4. The promotion recommendation system of claim 1 wherein the at least one recommended beverage comprises a plurality of recommended beverages each having at least one of the plurality of ingredients.

5. The promotion recommendation system of claim 4 wherein the plurality of recommended beverages each has a same at least one of the plurality of ingredients.

6. The promotion recommendation system of claim 1 wherein the at least one digital promotion comprises a plurality of digital promotions.

7. The promotion recommendation system of claim 6 wherein the plurality of digital promotions each correspond to one of the plurality of recommended beverages.

8. The promotion recommendation system of claim 1 further comprising a point-of-sale (POS) terminal at a redemption location; and
wherein the promotion recommendation server is configured to cooperate with the POS terminal to redeem the at least one digital promotion.

9. The promotion recommendation system of claim 1 wherein the promotion recommendation server is configured to determine the beverage associated with the social media influencer based upon the social media influencer liking the beverage.

10. The promotion recommendation system of claim 1 wherein the user device comprises a mobile wireless communications device.

11. A promotion recommendation server comprising:
a processor and an associated memory configured to identify a social media influencer followed by a given user by scraping data from a public facing portion of a social media account associated with the given user, the given user also having a user device associated therewith, determine a beverage associated with the social media influencer, identify a plurality of ingredients of the beverage based upon the determined beverage, cooperate with the user device to determine a current geographic location of the given user, generate at least one recommended beverage having at least one of the plurality of ingredients, at least one generated recommended beverage being a beverage that is different than the beverage associated with the social media influencer and having at least one of the plurality of ingredients, cooperate with the user device to determine a rate of change of geographic position of the given user, determine a threshold distance from the current geographic location based upon the rate of change of geographic position, determine at least one redemption location within the threshold distance from the current geographic location, generate at least one digital promotion for the at least one recommended beverage for redemption at the at least one redemption location, at least one generated digital promotion being for the at least one generated recommended beverage that is different from the beverage associated with the social media influencer and having at least one of the plurality of ingredients, and communicate the at least one digital promotion to the user device.

12. The promotion recommendation server of claim 11 wherein the at least one ingredient comprises a brand of alcohol.

13. The promotion recommendation server of claim 11 wherein the at least one ingredient comprises a type of alcohol.

14. The promotion recommendation server of claim 11 wherein the at least one recommended beverage comprises a plurality of recommended beverages each having at least one of the plurality of ingredients.

15. A method of processing a promotion recommendation comprising:

using a promotion recommendation server to identify a social media influencer followed by a given user by scraping data from a public facing portion of a social media account associated with the given user, the given user also having a user device associated therewith, determine a beverage associated with the social media influencer, identify a plurality of ingredients of the beverage based upon the determined beverage, cooperate with the user device to determine a current geographic location of the given user, generate at least one recommended beverage having at least one of the plurality of ingredients, at least one generated recommended beverage being a beverage that is different than the beverage associated with the social media influencer and having at least one of the plurality of ingredients, cooperate with the user device to determine a rate of change of geographic position of the given user, determine a threshold distance from the current geographic location based upon the rate of change of geographic position, determine at least one redemption location within the threshold distance from the current geographic location, generate at least one digital promotion for the at least one recommended beverage for redemption at the at least one redemption location, at least one generated digital promotion being for the at least one generated recommended beverage that is different from the beverage associated with the social media influencer and having at least one of the plurality of ingredients, and communicate the at least one digital promotion to the user device.

16. The method of claim 15 wherein the at least one ingredient comprises a brand of alcohol.

17. The method of claim 15 wherein the at least one ingredient comprises a type of alcohol.

18. The method of claim 15 wherein the at least one recommended beverage comprises a plurality of recommended beverages each having at least one of the plurality of ingredients.

19. A non-transitory computer readable medium for processing a promotion recommendation, the non-transitory computer readable medium comprising computer executable instructions that when executed by a processor cause the processor to perform operations comprising:

identifying a social media influencer followed by a given user by scraping data from a public facing portion of a social media account associated with the given user, the given user having a user device associated therewith;

determining a beverage associated with the social media influencer;

identifying a plurality of ingredients of the beverage based upon the determined beverage;

cooperating with the user device to determine a current geographic location of the given user;

generating at least one recommended beverage having at least one of the plurality of ingredients, at least one generated recommended beverage being a beverage that is different than the beverage associated with the social media influencer and having at least one of the plurality of ingredients;

cooperating with the user device to determine a rate of change of geographic position of the given user;

determining a threshold distance from the current geographic location based upon the rate of change of geographic position;

determining at least one redemption location within the threshold distance from the current geographic location;

generating at least one digital promotion for the at least one recommended beverage for redemption at the at least one redemption location, at least one generated digital promotion being for the at least one generated recommended beverage that is different from the beverage associated with the social media influencer and having at least one of the plurality of ingredients; and communicating the at least one digital promotion to the user device.

20. The non-transitory computer readable medium of claim 19 wherein the at least one ingredient comprises a brand of alcohol.

21. The non-transitory computer readable medium of claim 19 wherein the at least one ingredient comprises a type of alcohol.

22. The non-transitory computer readable medium of claim 19 wherein the at least one recommended beverage comprises a plurality of recommended beverages each having at least one of the plurality of ingredients.

* * * * *